United States Patent [19]

Mosier et al.

[11] 4,350,601

[45] Sep. 21, 1982

[54] PREPARATION OF VISCOSIFIERS FOR ZINC SALT WORKOVER AND COMPLETION BRINES

[75] Inventors: Benjamin Mosier, Houston, Tex.; Jack L. McCrary; Karl G. Guilbeau, both of Lafayette, La.

[73] Assignee: The Dow Chemical Co., Midland, Mich.

[21] Appl. No.: 264,605

[22] Filed: May 18, 1981

Related U.S. Application Data

[63] Continuation of Ser. No. 23,672, Mar. 26, 1979, abandoned.

[51] Int. Cl.$^3$ .............................................. E21B 43/00
[52] U.S. Cl. ............................... 252/8.55 R; 252/316; 252/363.5
[58] Field of Search ............ 252/8.5 A, 8.55 R, 363.5; 260/117; 106/161; 536/87, 88, 114

[56] References Cited

U.S. PATENT DOCUMENTS

| | | | |
|---|---|---|---|
| 2,879,268 | 3/1959 | Jullander | 536/87 |
| 3,007,865 | 11/1961 | Priest | 252/8.55 |
| 3,072,635 | 1/1963 | Menkart et al. | 536/87 X |
| 3,126,950 | 3/1964 | Carlberg et al. | 252/8.55 |
| 3,297,583 | 1/1967 | Dierichs et al. | 252/363.5 |
| 3,347,847 | 10/1967 | Engelskirchen et al. | 536/85 |
| 3,356,519 | 12/1967 | Chambers et al. | 536/87 X |
| 3,475,334 | 10/1969 | Boudreaux | 252/8.55 |
| 3,953,335 | 4/1976 | Jackson | 252/8.5 |
| 3,997,508 | 12/1976 | Ziche | 252/363.5 X |
| 4,025,443 | 5/1977 | Jackson | 252/8.55 |
| 4,041,234 | 8/1977 | Maske | 536/114 |
| 4,090,768 | 5/1978 | Jackson et al. | 252/8.55 |
| 4,140,639 | 2/1979 | Jackson | 252/8.5 |

*Primary Examiner*—Herbert B. Guynn
*Attorney, Agent, or Firm*—D. H. Fifield

[57] ABSTRACT

Viscosifiers for addition to high zinc salt brines, used as oil well workover and completion fluids, are prepared from polysaccharide gums or gelatin by treatment with formaldehyde and/or an aliphatic dialdehyde containing from 2 to 6 carbons. The treated viscosifiers have improved dispersibility and give increased viscosity effects in the brines. Preferably, the viscosifiers are prepared from carrageenan, locust bean gum, hydroxyethyl cellulose, or gelatin by treatment with a mixture of formaldehyde and glyoxal.

6 Claims, No Drawings

PREPARATION OF VISCOSIFIERS FOR ZINC SALT WORKOVER AND COMPLETION BRINES

CROSS-REFERENCE TO RELATED APPLICATIONS

This is a continuation of application Ser. No. 23,672, filed Mar. 26, 1979, now abandoned.

BACKGROUND AND PRIOR ART

To avoid damage to the production stratum, clear water fluids as distinguished from drilling muds are used in workover and completion operations as a standard oil well drilling practice. The clear water fluids are concentrated water solutions of common metal salts, such as NaCl, $CaCl_2$, $CaBr_2$, and the like. The salt selected and the concentration employed are determined by the desired density of the fluid. To obtain very high densities, zinc salts are used, such as $ZnBr_2$ and mixtures thereof with $CaBr_2$.

Additives are used with clear water fluids to control and increase their viscosity. Increased viscosity enhances the cuttings carrying capacity of the fluid, reduces fluid loss, and tends to promote conditioning of the formation to minimize caving and water damage to water-sensitive formation. Polysaccharide gums, such as guar gum, locust beam gum, and hydroxyethyl cellulose have been used or proposed for use in clear water workover and completion fluids. In particular, hydroxyethyl cellulose (HEC) and guar gum have been employed, but HEC is the only polysaccharide gum which has been used with some success in high density zinc salt brines.

Hydroxyethyl cellulose (HEC) and other polysaccharide gums are supplied in dry powder form. Their addition to workover and completion brines requires special mixing and dispersing equipment. HEC, guar gum, and similar additives tend to hydrate too rapidly or non-uniformly, and form clumps referred to as "fish eyes." Such fish eyes can reduce the effectiveness of the viscosifier, and, in extreme cases, cause formation damage. It has been found particularly difficult to add a viscosifier to a high density zinc brine. One procedure now used in oil field practice is to prehydrate the HEC in an alcohol-water slurry, and then slowly add the slurry to the zinc brine accompanied by turbulent mixing. This practice requires the use of a separate tank for the prehydration, and involves additional time and expense.

It is desired to develop viscosifiers which give a greater viscosity increase for a given amount of the additive, especially with reference to zinc brines. Although HEC is used with zinc brines, the viscosity effect is less than desired, and as the density of the brine increases (with increasing zinc content), the viscosity effect of the HEC additive decreases.

SUMMARY OF INVENTION

The present invention is based in part on the discovery that the dispersibility and viscosity effect of polysaccharide gum viscosifiers can be substantially improved by a chemical treatment in which polysaccharide gum is contacted with an organic solvent solution of formaldehyde or a dialdehyde such as glyoxal. For example, with the most commonly used viscosifier, hydroxyethyl cellulose, and with particular reference to high density zinc brines, good dispersibility is obtained without prehydration and while avoiding the formation of fish eyes by ordinary mixing equipment. For a given concentration in the brine, such as 1% by weight, the viscosity effect, as determined by apparent viscosity, can be increased as much as 200%. Other polysaccharide gums which have not heretofore been useable with zinc brines can be modified by the aldehyde treatment of this invention so that they become advantageous viscosifiers for zinc brines. Such desirable treated viscosifiers include carrageenan in its usual salt form and locust bean gum. In particular, it is believed that the modified carrageenan viscosifier, either alone or in admixture can provide improved results over present standard HEC viscosifier, and also as compared with hydroxyethyl cellulose modified by the treatment of this invention. The carrageenan viscosifiers of this invention have been found to give greater viscosity effects at the same additive level than the modified HEC viscosifiers of this invention although HEC is also substantially improved. Further, it appears likely that the modified carrageenan viscosifier may deposit less residue in the oil well formation. However, modified HEC can be advantageously employed either alone or in admixture with a modified carrageenan viscosifier. In addition to polysaccharide-type viscosifiers, the present invention can be applied to proteinaceous viscosifiers such as gelatin. With gelatin, by the treatment of this invention, viscosity increases of as much as 300% can be obtained.

DETAILED DESCRIPTION

Polysaccharide gum viscosifiers include natural vegetable gums, such as carrageenan, locust bean gum, and the like. Similar gums can be produced as fermentation products of bacteria or yeast, and include gum dextran, xanthan gum and the like. The synthetic cellulose-derived polysaccharide gums include particularly hydroxyethyl cellulose. Other synthetic gums of this type are known and are commercially available, such as carboxymethyl cellulose, but have not been used as viscosifiers for clear water fluids. In general, the process of this invention can be applied to the class of polysaccharide gums and also to gelatin. The dispersibility and/or viscosity effect of all such gums appears to be improved at least to some extent by the treatment. However, the preferred starting materials include particularly carrageenan gum, locust bean gum, hydroxyethyl cellulose, and gelatin. With these gums, viscosity improvement has been found to be maximized. Carrageenan may be employed in any of its usual salt forms, such as sodium, potassium, or calcium carrageenan. In relation to costs and the results obtained, the sodium carrageenan salt is particularly desirable. such carrageenan salts can be obtained from Marine Colloids, Inc., Springfield, N.J. Hydroxyethyl cellulose is available from a number of commercial sources, including Hercules, Inc., Wilmington, Del., and Union Carbide Corp., Chemical & Plastics Division, New York, N.Y. For use as a viscosifier, the molecular weight of the hydroxyethyl cellulose may range from about 100,000 to 600,000 or higher. The gelatin may be either acid precursor gelatin (Gelatin A) or the base form of gelatin (Gelatin B).

As used in the process of the present invention, the gum to be treated should be in particulate form, such as in the form of a dry powder. The moisture content of the gum should be low, since it is desirable to avoid hydration during treatment. However, the treatment can be carried out in an organic solvent solution so as to maintain the gum in substantially unswollen condition. Some water can be present in the solvent carrier for the treating agent, but it should be less than the amount of water which will cause the gum to hydrate. Polar organic solvents are particularly desirable as the carrier for the treating agent, such as the lower aliphatic alcohols, including particularly the monohydric alcohols containing from 1 to 4 carbon atoms. A particularly desirable solvent is isopropanol or a mixture of isopropanol with a minor proportion of water. Where the treating agent is obtained commercially as a water solution, it can be added to the isopropanol or other alcohol, and the resulting solvent mixture can contain up to 10% or more water. Since the presence of water is not required for the desired reaction, however, the amount of water can be kept to a minimum. Other organic polar solvents can also be used, such as methyl ethyl ketone, diethyl ether, and the like, either alone or in admixture with an alcohol.

The treating agent may comprise formaldehyde, or an aldehyde providing two aldehyde groups and containing from 2 to 6 carbon atoms. Such dialdehydes include glyoxal and glutaraldehyde. A preferred treating agent comprises a mixture of formaldehyde and glyoxal, such as a mixture containing from 25 to 75 parts by weight of formaldehyde together with from 25 to 75 parts by weight of glyoxal. Excellent results are obtained by using a mixture of equal parts by weight of formaldehyde and glyoxal.

The aldehyde treating agents are readily soluble in the organic polar solvents. Further, they may be added to the organic solvent as concentrated aqueous solutions, since the organic solvent is preferably water-miscible. For example, an aqueous solution of formaldehyde containing from 30 to 40% formaldehyde can be used, as can an aqueous solution of glyoxal containing from 30 to 50% glyoxal by weight.

The carrier solvent may contain from 0.5 to 15% by weight of the aldehyde reagent, such as, for example, from 3 to 10% of the reagent. While higher reagent concentrations might be used, there does not appear to be any advantage in using reagent concentrations above 10-15%. In practice, good results are obtained with a 6-8% concentration of the aldehyde reagent in the solvent carrier.

The treatment of the viscosifier can be carried out in a very simple manner. All that is required is the contacting of the treating solution with the viscosifier, which is in the form of a particulate solid, the amount of the treating solution applied at least being sufficient to thoroughly wet the viscosifier. To assure completion of the reaction, the viscosifier can be mixed in the presence of the treating solution for at least 15 minutes, such as for a period of 1 hour. The reaction can be carried out at ordinary room temperature, such as a temperature from 20° to 30° C., and the amount of the treating solution used does not appear to be critical. For example, from 0.5 to 5.0 parts by weight of the treating solution can be used per part of gum. In practice, good results can be obtained using from 0.8 to 2.0 parts of the treating solution per part of gum. Since the solvent is removed after the treatment, in general, it is desired to employ a minimum amount of the treating solution, such as approximately one part of the treating solution per part of the gum.

Although the treated viscosifier could be used as produced, that is, the viscosifier and treating solution could be added directly to the clear water brine, it is preferred for commercial purposes to recover the treated viscosifier in dry form. This can be done without difficulty since the particulate viscosifier has been maintained in essentially unswollen condition during the contacting with the treating solution. The treated viscosifier can be recovered essentially free of the solvent carrier by conventional drying procedures. For example, drum-drying or flash-drying can be used. If sufficient treating solution is present to form a slurry, it may be desirable to first concentrate the treated viscosifier by centrifugation or filtration, and thereafter to carry out the drying of the separated viscosifier. One convenient apparatus for the drying step is a rotary vacuum dryer. Alternatively, flash-drying can be carried out by atomizing the particulate carrier into a heated airstream. The use of a rotary vacuum dryer will be further illustrated in the following examples.

The treated viscosifier in dry particulate form can be readily incorporated in clear water brines by standard mixing procedures. The equipment at the drilling site includes a tank equipped with a jet hopper-mixer referred to as a "Lightening Mixer." The apparatus utilizes propeller-type agitation, and the liquid is recirculated through a venturi in the feed hopper. Although no liquid heating means are usually provided, the temperature of the brine can be raised by recirculating the brine through the hopper. For example, 110° F. is a desirable temperature to use for addition of the treated viscosifier, and this can easily be obtained by recirculation without additional heating means. With the brine recirculating through the jet hopper, and after the appropriate temperature has been developed, such as 105°–115° F., the viscosifier powder is gradually added to the hopper, and thereby incorporated in the brine. The viscosifier hydrates gradually and uniformly, and little or no fish eyes are formed. It is therefore not necessary to use a prehydration procedure, as is presently employed with untreated HEC. The amount of viscosifier to be added will depend on the desired viscosity of the brine. In general, it will usually be desired to add from 1 to 6 pounds of the viscosifier (dry basis) per barrel of brine (42 gallons). For example, the most desirable level may be about 3 to 4 pounds per barrel of brine.

While the viscosifiers prepared in accordance with the present invention can be advantageously used with low or moderate density brines, such as brines formed from NaCl or $CaCl_2$, or brines containing $CaBr_2$ either alone or in admixture with $CaCl_2$, the treated viscosifiers provide the greatest advantage when used with high density zinc brines. Such brines contain zinc bromide in admixture with a calcium salt, such as calcium bromide alone or in combination with calcium chloride. The relative amounts of the zinc bromide to the calcium salt determine the density of the brine, which can range from about 15 pounds per gallon to around 19 pounds per gallon. Since a density up to 15.1 pounds per gallon can be obtained with calcium bromide-calcium chloride mixtures, the zinc brines containing zinc bromide in admixture with calcium bromide are employed at densities greater than 15.1 pounds per gallon, such as 15.2 lbs-gal. and higher. With such brines, greatly improved results are obtained with the treated viscosifiers of this invention as compared with the prior art untreated hydroxyethyl cellulose. For example, treated HEC can be added more easily to the zinc brine, and a greater viscosity effect can be obtained.

This invention in its various aspects is further illustrated by the following examples.

EXAMPLE I

For the purpose of comparing the viscosity effects in a typical zinc brine a number of polysaccharide gums and gelatin were treated by a preferred procedure. The treating solution was prepared from 37% aqueous formaldehyde (formalin) and 40% aqueous glyoxal, using 55 parts by weight of formalin, 55 parts of the glyoxal solution, and 720 parts of isopropyl alcohol (100%). Approximately 10 parts by weight of this treating solution were used per part of the gum being treated, the gum, which was in the form of a fine powder, being thoroughly mixed with the treating solution. The treating solution was left in contact with the gum for approximately 1 hour at room temperature (20°-25° C.). The treated gums were then dried in a 200° F. oven. After drying, the dried material was ground to assure that it was in the form of a fine powder. (In commercial practice, this grinding step can probably be omitted).

The zinc brine used in the comparative tests contained zinc bromide and calcium bromide in the proportions giving a density of 16.0 pounds per gallon. The treated and untreated gums were added to specimens of the zinc brine at a level of 1% by weight (35 lbs./barrel). The measurements of apparent viscosity in centipoise (cps) were determined using a Fann motor-drive viscosimeter as described in "Standard Procedure for Testing Drilling Fluids," Section 2, Viscosity and Gel Strength, "API RECOMMENDED PRACTICE, American Petroleum Institute, API RP 13 B," April, 1969, pages 5-6. When this apparatus is operated at a speed of 600 rpm, the apparent viscosity in centipoises equals the 600 rpm reading divided by 2.

The comparative data is summarized below in Table A:

TABLE A

| Viscosifier | Apparent Viscosity, cps | |
|---|---|---|
| | Untreated | Treated |
| Na Carrageenan | 10.4 | 28.3 |
| K Carrageenan | 13.2 | 28.1 |
| Ca Carrageenan | 11.2 | 26.6 |
| Locust Bean Gum | 9.0 | 20.0 |
| Gelatin A (acid precursor) | 10.2 | 23.4 |
| Gelatin B (base) | 8.4 | 24.6 |
| Hydroxyethyl cellulose | | |
| Natrosol HMR[a] | 14.7 | 26.2 |
| Natrosol 250 MR[b] | 9.6 | 18.6 |
| QP-100 M[c] | 9.8 | 22.2 |
| 50/50 Mixture Locust | | |
| Bean Gum & Na Carrageenan | 9.0 | 19.6 |
| Gum Ghatti | 8.5 | 12.6 |
| Gum Tragacanth | 9.1 | 24.2 |
| Gum Arabic | 9.0 | 18.9 |
| Gum Karaya | 11.5 | 17.2 |
| Gum Okra | 9.8 | 14.2 |
| Xanthan Gum | 6.9 | 10.2 |
| Zein | 8.8 | 11.0 |
| Na Alginate | 8.3 | 9.0 |
| K Alginate | 9.6 | 12.6 |
| Propylene Glycol Alginate | 10.4 | 14.2 |
| Carboxmethyl Cellulose | 9.6 | 10.7 |
| Guar Gum | | |
| Jaguar A-90F[d] | 10.2 | 13.2 |
| Jaguar 59MS[e] | 10.6 | 10.9 |
| Jaguar LMHP[f] | 10.6 | 12.9 |

[a]Natrosol MHR: HEC mol. wt. 500,000-600,000, Hercules, Inc., Wilmington, Delaware.
[b]Natrosol 250MR: HEC mol. wt. 400,000-500,000, Hercules, Inc., Wilmington, Delaware.
[c]QP-100M: HEC mol. wt. 100,000-200,000, Union Carbide Corp., Chemical & Plastics Division, New York, N. Y.
[d]Jaguar A-40F: non-ionic cellulosic derivative, mol. wt. approx. 200,000, Stein, Hall & Co., Inc. Louisville, Ky.
[e]Jaguar C-13: cationic cellulosic derivative, mol. wt. 200,000-300,000, Stein, Hall & Co., Inc., Louisville, Ky.
[f]Jaguar CMHP: anionic cellulosic derivative, mol. wt. 200,000-300,000, Stein, Hall & Co., Inc., Louisville, Ky.

EXAMPLE II

The commercial production of treated viscosifiers in accordance with the present invention, the treatment and drying steps may be carried out continuously in a drum-drying apparatus. The following is illustrative:

(1) To a rotary vacuum dryer which has been purged of air with nitrogen, add 1,000 parts by weight of the polysaccharide gum viscosifier to be treated, such as Na Carrogeenan, and 500 parts of isopropyl alcohol (99%).

(2) Tumble 15 minutes to wet gum powder, then add a solution made up of 500 parts of isopropyl alcohol, 55 parts of 37% aqueous formaldehyde, and 55 parts of 40% aqueous glyoxal.

(3) Without heat or vacuum tumble mixture for 1 hour.

(4) Apply heat with hot water to the dryer jacket and reduce the internal pressure to less than 100 mm. Collect through the vapor condenser the evolved alcohol and water, for example about 720 parts of isopropyl alcohol and 33 parts of water over 4.5 hour period.

(5) Continue to apply heat and maintain vacuum for 1 hour to remove final traces of volatiles.

(6) Final product will be fine powder of treated viscosifier.

In the foregoing procedure, formaldehyde or glyoxal can be used alone, or other dialdehyde substituted, such as glutaraldehyde. The treating solution may contain from 6 to 8% by weight of total aldehyde reagent, and from 0 to 10% by weight of water in admixture with the isopropyl alcohol.

EXAMPLE III

The procedure described in Example II is followed, except that a mixture of Na Carrageenan with locust bean gum and/or hydroxyethyl cellulose is used. For example, from 25 to 75 parts by weight of carrageenan (dry basis) can be admixed with 25 to 75 parts of locust bean gum or HEC, all of the gums being in the form of the fine powders. For example, 50 parts by weight each of Na Carrageenan can be mixed with 50 parts of locust bean gum, or 50 parts of HEC Natrosol HMR. The mixtures are then treated and dried as described in Example II.

EXAMPLE IV

Treating solutions are prepared by dissolving (a) formaldehyde, 37% aqueous, (b) glyoxal, and (c) glutaraldehyde in isopropanol to form 3-5% by weight solutions of the active agent. From 1 to 10 parts by weight of the solutions per part of gum are applied at room temperature for 30 to 60 minutes. The solutions are removed and the treated gum is dried and obtained in a particulate form. The viscosity effect of the treated gum is increased. For example, Na Carrageenan tested as described in Example I (zinc basis) gives as representative apparent viscosity values: untreated-10; formaldehyde-21; glyoxal-23; glutaraldehyde-21.

We claim:

1. A viscosified zinc salt brine for use as a well fluid, comprising an aqueous solution of zinc bromide in admixture with calcium salt selected from the class consisting of calcium bromide, calcium chloride, and mixtures thereof, said solution containing sufficient zinc to provide a density of at least 15 pounds per gallon, said brine containing from 1 to 6 pounds per barrel of a treated viscosifier prepared by forming a treating solution comprising an aldehyde reagent dissolved in a solvent carrier, said aldehyde reagent being selected from the class consisting of formaldehyde, aliphatic dialdehydes containing from 2 to 6 carbons, and mixtures thereof, said solvent carrier being selected from the class consisting of organic polar solvents in which said aldehyde reagent is soluble and mixtures thereof with a minor proportion of water, said treating solution containing from 0.5 to 15% by weight of said aldehyde reagent, and contacting said treating solution with a viscosifier suitable for use in well fluids, said viscosifier being in the form of a particulate solid and being selected from the class consisting of hydroxyethylcellulose, xanthan gum, the natural vegetable gums and gelatin, a sufficient amount of said treating solution being used to wet said particulate viscosifier, said viscosifier being maintained is essentially unswollen condition during said contacting.

2. The viscosified zinc salt brine of claim 1 in which said treated viscosifier is a carrageenan salt.

3. The viscosified zinc brine of claim 1 in which said treated viscosifier is locust bean gum.

4. The viscosified zinc brine of claim 1 in which said treated viscosifier is gelatin.

5. The viscosified zinc brine of claim 1 in which said treated viscosifier is hydroxyethylcellulose.

6. The viscosified zinc brine of claim 1 in which said treated viscosifier is xanthan gum.

* * * * *